United States Patent [19]

Stern

[11] 4,066,551

[45] Jan. 3, 1978

[54] PORTABLE WATER FILTRATION DEVICE

[75] Inventor: Emanuel Stern, Mount Kisco, N.Y.

[73] Assignee: Dynek Corporation, Port Chester, N.Y.

[21] Appl. No.: 647,319

[22] Filed: Jan. 7, 1976

[51] Int. Cl.² .............................................. B01D 27/02
[52] U.S. Cl. .................................... 210/282; 210/475
[58] Field of Search ............... 210/172, 416 DW, 282, 210/266, 205, 64, 60, 196, 416 R, 416 AS, 62, 425, 473–475

[56] References Cited

U.S. PATENT DOCUMENTS

| 870,631 | 11/1907 | Kneuper | 210/425 |
|---|---|---|---|
| 3,061,100 | 10/1962 | Fehlmann | 210/416 AS |
| 3,314,544 | 4/1967 | Rosaen | 210/172 |
| 3,430,769 | 3/1969 | Sanzenbacher | 210/416 DW |
| 3,486,622 | 12/1969 | Rosaen et al. | 210/172 |
| 3,756,413 | 9/1973 | Gartner | 210/266 |
| 3,788,982 | 1/1974 | Zsoldos | 210/60 |

Primary Examiner—Thomas G. Wyse
Assistant Examiner—Benoit Castel
Attorney, Agent, or Firm—Kenyon & Kenyon

[57] ABSTRACT

The portable water filtration device may be made in various ways. In some embodiments, the reservoir is formed in a seal-tight housing and the water is pumped by means of an air pump through a filter located within the reservoir and thereafter passed through a spout. In another embodiment, use is made of a blender with the water being forced by an impeller from within a lower compartment of the blender jar into a filter and thereafter out a spout on the filter. Other pump means may also be used to pump the water through a filter and out an outlet from a closed reservoir. Sterilizing means may also be provided in the various embodiments to sterilize the water prior to filtration. Also, the water being treated may be recycled to increase the time of treatment.

4 Claims, 17 Drawing Figures

U.S. Patent   Jan. 3, 1978   Sheet 1 of 3   4,066,551
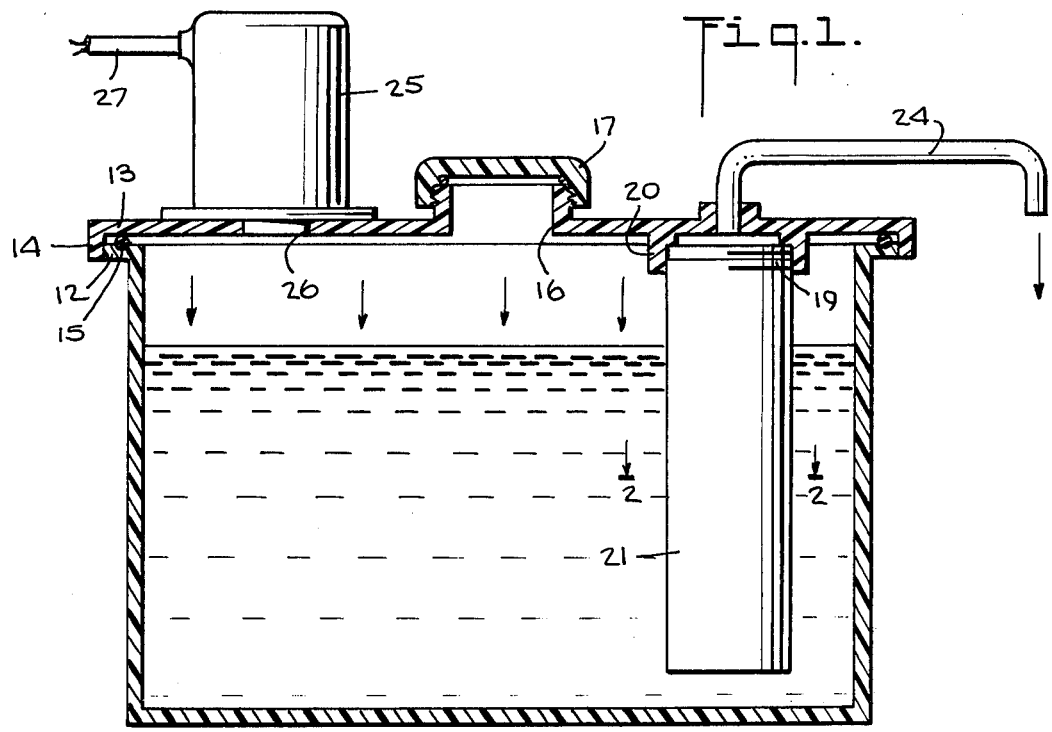
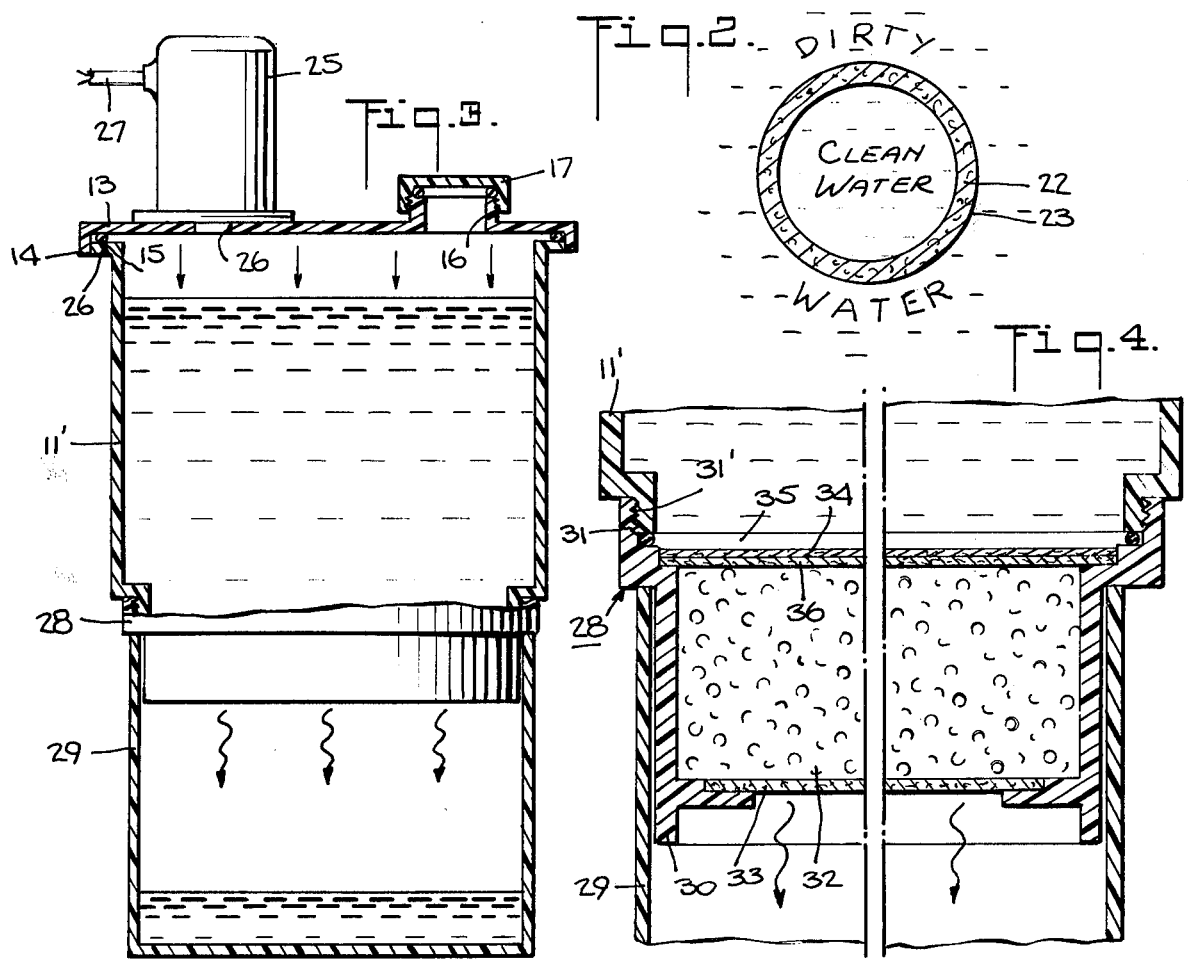

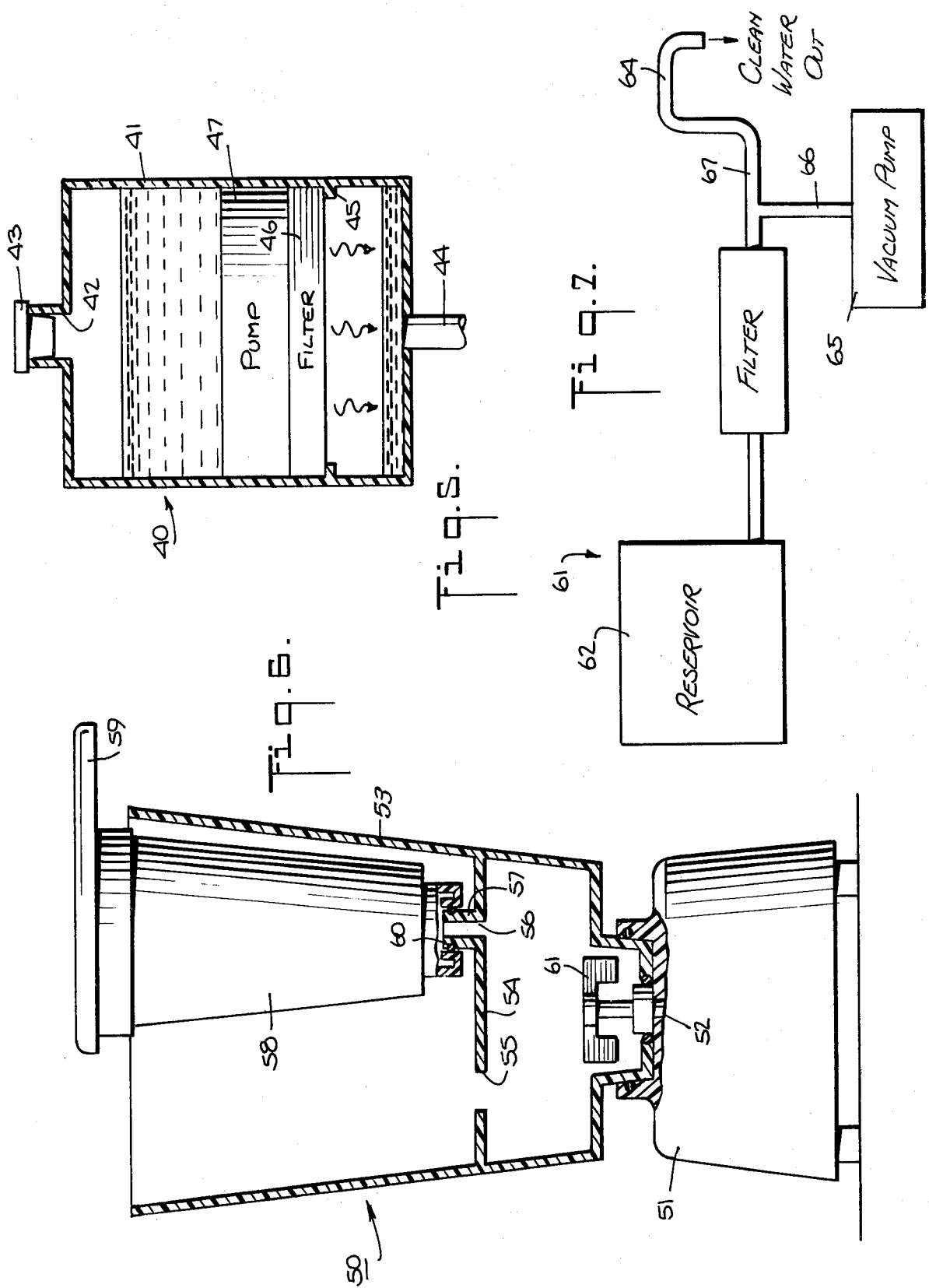

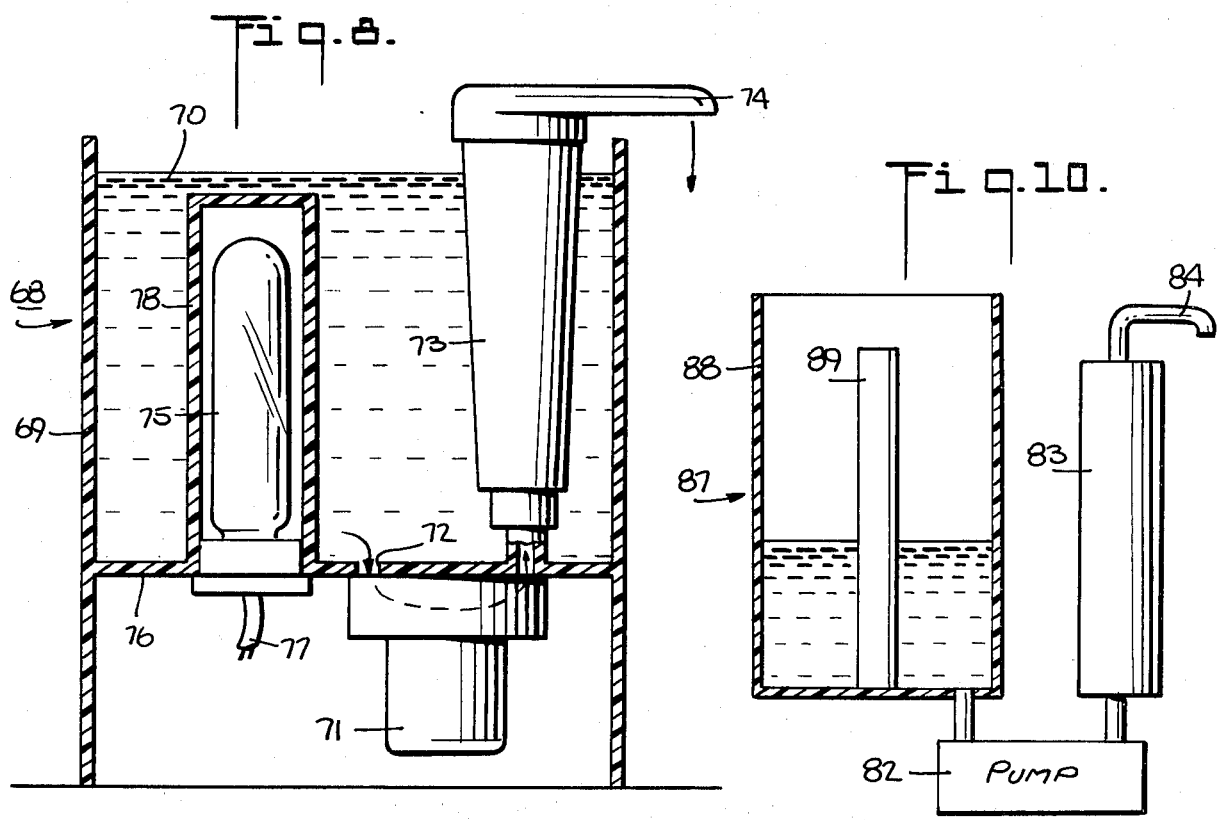
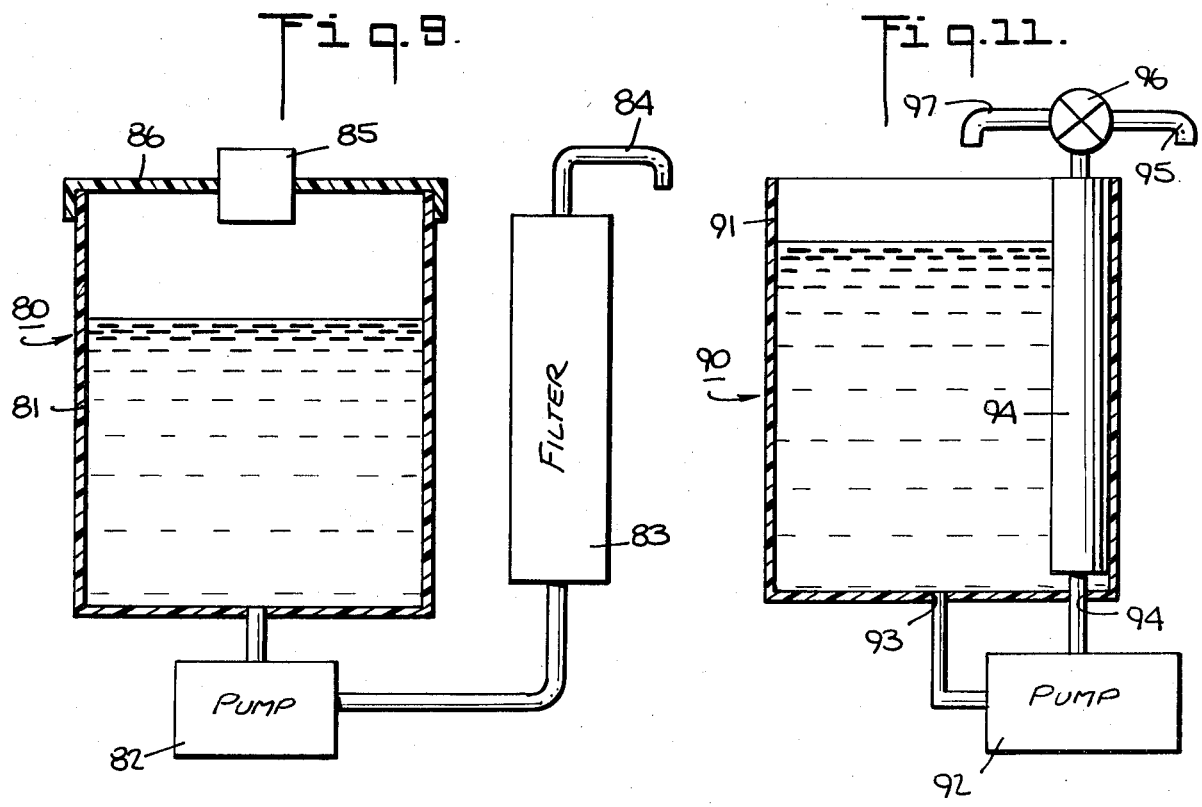

PORTABLE WATER FILTRATION DEVICE

This invention relates to a portable water filtration device.

As is known, various types of water filtration systems have been known for treating water for consumption in various sized municipalities. However, in many instances, the quality of water avaiable for drinking purposes has been objectionable. As a result, various attempts have been made to obtain drinking water of pure form and good taste. For example, apart from commercially supplied spring water and the like, various types of portable water filtration devices have been proposed for use in the home or for use at times when pure water is not readily available and small quantities are needed.

Accordingly, it is an object of the invention to provide a water filtration device which is readily portable.

It is another object of the invention to provide a portable water filtration device which is capable of dispensing purified water of good taste.

It is another object of the invention to provide a water filtration device which is capable of recycling the water being treated to improve the effect of the treatment.

It is another object of the invention to provide a water filtration device which is of relatively inexpensive construction.

Briefly, the invention provides a portable water filtration device which is of compact construction and an improvement over the type as described in U.S. patent application Ser. No. 539,608, filed Jan. 8, 1975, now U.S. Pat. No. 3,950,253.

The portable water filtration device comprises a housing which defines a reservoir chamber for the water, a cover which is secured to the housing in seal-tight relation, a filter which is secured to the cover and which depends into the chamber and a pump means for pumping water from the reservoir chamber through the filter. The filter includes at least one filtering medium. In addition, a spout communicates with the filter and extends through the cover to deliver treated water from the filter. The pump means may be of any suitable type such as a positive displacement pump, a pressure pump or a vacuum pump.

In one embodiment, the device has an inlet in the cover for introduction of water into the chamber and means for selectively sealing the inlet. In addition, the pump means is in the form of an air pump which is mounted on the cover to pump air into the reservoir chamber in order to force the water in the chamber through the filter and into the spout. During use, the pump is switched on to build up an air pressure in the reservoir chamber so that the water is forced through the filter and, thence, out of the spout in treated form.

In a second embodiment, the water filtration device comprises a housing which defines a reservoir chamber, a cover which is secured to the housing in seal-tight relation, a decanter which mounts the housing thereon, a filter disposed between the housing and the decanter and an air pump mounted on the cover to pump air into the chamber to force water from the reservoir chamber through the filter and into the decanter. As above, the device also includes an inlet in the cover for the introduction of water and a means such as a threaded cap for sealing the inlet. The device operates in a manner similar to the above embodiment.

In still another embodiment, the water filtration device includes a housing having a bottom and which defines a reservoir chamber. In addition, a filter is mounted within and across the housing in spaced relation to the bottom in order to divide the chamber into upper and lower portions. A pump is mounted above the filter in the upper portion of the chamber in order to pump water in the upper chamber through the filter and into the lower portion. In addition, a drain is secured in the bottom to communicate with the exterior of the housing. As above, a sealable inlet is provided to the upper portion for the introduction of water into the upper portion. The operation of the device is similar to the above in that the pump is used to pump water through the filter into the lower portion of the chamber.

In another embodiment, the filtration device uses a power driven blender having a base and an upwardly extending rotatable shaft. In this device, a jar is mounted on the blender base over the shaft in order to receive water. In addition, a shelf is disposed within and across the lower portion of the jar. This shelf has an inlet to permit passage of water below the shelf and an outlet in which a nozzle is secured. A filter is sealingly mounted on the nozzle within the jar and includes a spout at the upper end. In addition, an impeller within the jar and below the shelf is coupled to the shaft of the blender in order to force water below the shelf through the nozzle and into the filter and out of the spout upon rotation of the shaft.

In still another embodiment, instead of placing the pump upstream of the filter, a vacuum pump may be placed downstream of the filter so as to draw the water from the reservoir to the filter under a suction force prior to dispensing from the device. This allows the use of atmospheric pressure to force the water through the filter.

In still another embodiment, the device includes a housing which defines a reservoir, a pump which is mounted to pump water from the reservoir and a filter to receive the pumped water for filtration purposes prior to dispensing from the device. In this embodiment, a sterilization means is provided within the housing in order to sterilize the water. To this end, the sterilization means is in the form of an ultraviolet lamp which is mounted to extend into the reservoir chamber. In this instance, a quartz envelope or other means is mounted about the ultraviolet lamp in order to protect the lamp against the water.

In still another embodiment, the sterilization means is in the form of a chlorine column which is mounted within the reservoir. The chlorine column consists of a water soluble chlorine compound so that no matter how little water is placed in the reservoir, the amount of chlorine compound exposed to the water is adequate for sterilization purposes. This technique eliminates the need to meter out specific amounts of chlorine since chlorination is effected only by that water which is in contact with the chlorine column.

In still another embodiment, the sterilization means may be in the form of a chlorine injector which is mounted in the housing cover. In this case, when the device is activated so that the pump begins to pump water from the reservoir to the filter, a dosage of chlorine is automatically injected into the water to be treated. The chlorine in the water may be removed by the use of charcoal within the filter so as to improve the taste of the treated water.

Finally, in another embodiment, a recirculating system may be utilized. In this instance, the water is made to recirculate through a filter a number of times in order to achieve higher degrees of purification each time. For example, any one of the above devices may be equipped with an electrically activated valve which is mounted to pass the water to the outlet spout or to re-cycle the water back to the reservoir. A three-position switch may also be used to vary the circulating time. Thus, position one would be used for moderately pure tap water; position two would increase the length of the purification cycle and would be used for impure waters; and position three could be used where highly impure waters are encountered.

The pumps which are utilized in the various embodiments are of generally small capacity. In the case of small air pumps, significant pressures, for example 15 pounds per square inch can be built up. Thus, the pumps produce a good flow rate through the filters even where a high density filtering medium is used.

The filters which are used with the various embodiments may be of various constructions. For example, a large diameter filter may be used to provide a large filtration area. Such a filter may use a submicron membrane without the need for a high pressure pump. However, a pressure pumping technique must be used in order to force the water through the filter. In another embodiment, the filter may also be made large to permit the use of sub-micron filters without resort to ultra-high pressure pumps. In addition, the filter area can be increased by stacking several stages of the filter. In this case, the filter is made in a layered manner with a first layer of prefilter material, an activated charcoal layer or other treatment medium and a polishing filter. Such a filter may easily be placed within the embodiment as illustrated in FIG. 5.

In any of those embodiments where a sterilization means is utilized, a time delay sufficient to disinfect the water may may be built into a switch for the sterilization means. After sterilization, the water is forced through a filter which includes a charcoal medium so as to enhance the taste of the water and to control the odor of the water.

Other sterilization techniques may also be utilized. For example, an infrared lamp with ultrasonic agitation may also be used. In addition, bromide sterilization and tri-iodine systems may also be utilized.

The filter may also include a sterilizing medium such as a silver treated activated charcoal. The silver may originate as silver nitrate and be chemically precipitated as metallic silver on a porous charcoal medium or may be vapor phase deposited directly on the medium or may be electro-phoretically deposited.

These and other objects and advantages of the invention will become more apparent from the following detailed description and appended claims taken in conjunction with the accompanying drawings in which:

FIG. 1 illustrates a cross-sectional view of a portable water filtration device utilizing a closed reservoir chamber in accordance with the invention;

FIG. 2 illustrates a cross-sectional view taken on line II—II of FIG. 1;

FIG. 3 illustrates a modified portable water filtration device employing a decanter in accordance with the invention;

FIG. 4 illustrates a cross-sectional view of a filter as used in the embodiment of FIG. 3;

FIG. 5 illustrates a further embodiment of a water filtration device according to the invention;

FIG. 6 illustrates a portable filtration device which employs a blender in accordance with the invention;

FIG. 7 illustrates a further modified portable water filtration device according to the invention;

FIG. 8 illustrates a water filtration device employing an ultraviolet sterilizing lamp in accordance with the invention;

FIG. 9 schematically illustrates a portable water filtration device employing a chlorine injection sterilizing means in accordance with the invention;

FIG. 10 schematically illustrates a portable water filtration device employing a chlorine column in accordance with the invention; and FIG. 11 schematically represents a portable water filtration device employing a recirculating means in accordance with the invention.

Referring to FIG. 1, the portable water filtration device 10 includes a housing 11 which defines a reservoir chamber for water of a capacity suitable for use in the home. For example, the reservoir may have a capacity of one to five quarts. The housing 11 includes an annular lip 12 at the upper end upon which a cover 13 is seated. The cover 13, as shown, includes a dependent flange 14 which fits about the lip 12 and cooperates with the lip 12 so as to secure the cover 13 to the housing 11. To this end, the cover may be in friction fit engagement with the housing 11 or may be threaded thereon. In addition, a seal 15 is disposed between the cover 13 and lip 12 on the housing 11 in order to provide a seal-tight fit between the cover 13 and housing 11. An inlet 16 is provided in the cover 13 for the introduction of water into the housing chamber. In addition, a means such as a threaded cap is mounted over the inlet for selectively sealing the inlet 16.

As shown, a filter 18 is secured to the cover 13 and depends into the housing chamber. As indicated, the upper end of the filter has a threaded portion 19 which threads into a suitable socket 20 into the cover 13. For this purpose, the filter may include an outer envelope or cage which contains at least one filtering medium 22 (FIG. 2) which is encased within a membrane 23 of sub-micron type. To this end, the membrane 23 is such as to be impermeable to the passage of water under normal pressures but which is rendered permeable under pressurized conditions.

The filtration device 10 also includes a spout 24 which is mounted in the cover 13 in communication with the filter 18 so as to dispense treated water therefrom. Also, a pump means 25 such as an air pump is mounted on the cover and communicates via a suitable opening 26 in the cover with the reservoir chamber. The pump 25 may be manually operated or may be electrically operated. In the latter case, suitable electric lines for a power cord 27 are provided for connection to a power source (not shown).

In use, with a level of water within the housing chamber, the pump 25 is activated so as to force air into the chamber. As the air pressure builds up on the water, the resistance of the membrane 23 to the passage of water is overcome and water flows through the membrane 23 into the filtering medium 22. Continued pumping causes the water within the filter to pass upwardly into and through the spout 24.

After dispensing of the treated water, a fresh supply may be introduced to the inlet 16 after unthreading of the cap 17.

Referring to FIG. 3, wherein like reference characters indicate like parts as above, the housing 11' has an open bottom which threadably receives a filter 28 in seal-tight manner. In addition, a decanter 29 is mounted below the filter 28 to receive treated water.

Referring to FIGS. 3 and 4, the filter 28 includes a housing 30 which is provided with a thread 31 to thread onto a mating thread 31' on the lower end of the housing 11'. In addition, the filter includes a filter medium 32, a distributor disc 33 on the downstream side of the filter medium 32, a fine filter 34 on the upstream side of the filter medium 32 and a sonic seal 35 upstream of the filter 34. In addition, a membrane 36 is provided between the fine filter 34 and the filter medium 32. This membrane, as above, is normally impermeable to the passage of water but under pressure is rendered permeable.

The decanter 29 has an open top so as to receive the lower end of the filter housing 30. As shown, the filter 28 rests on the top of the decanter 29 so as to be disposed between the reservoir housing 11' and the decanter 29.

In use, with a level of water in the reservoir of the housing 11', the pump 25 is activated to increase the air pressure within the housing 11' to a degree sufficient to force the water through the filter 28. The treated water falls into the decanter 29. Thereafter, after filling of the decanter 29 to a suitable level, the pump 25 may be deactivated and the decanter removed. For this purpose, the decanter may have a handle (not shown) thereon to permit manual handling. Alternatively, the decanter may be provided with a valve spout (not shown) so as to permit dispensing of water in small amounts.

Referring to FIG. 3, the filter 28 may alternatively be of a flat pack type which includes a plurality of submicron filter discs disposed in layered relation.

Referring to FIG. 5, the portable water filtration device 40 includes a housing 41 in the form of a closed container having an inlet 42 and a plug 43 for sealing the inlet 42 in any suitable manner. In addition, a drain 44 is formed in the bottom of the housing 41 to communicate with the exterior of the housing. The housing also includes an internal lip or ledge 45 on which a filter 46 is mounted. The filter 46 may be of a type as shown in FIG. 4 above or may be of a flat pack type as described above. In addition, a pump 47 is mounted over the filter for pumping water above the pump through the filter 46. The pump may be of the positive displacement type and may be of any suitable construction. In use, water is introduced into the housing 41 via the inlet 42. Thereafter, the plug 43 is put in place to seal the housing 41. Thereafter, the pump 47 is activated by any suitable means (not shown) so as to pump the water through the filter 46. As shown, the filter 46 is mounted above the bottom of the housing 41 so that a chamber is formed to receive the treated water.

The treated water may flow directly out of the drain 44 or, the drain 44 may be closed via a plug or valve (not shown) until a higher level of treated water is obtained in the chamber below the filter 46.

Referring to FIG. 6, the portable water filtration device 50 makes use of a blender 51 of known construction. As shown, the blender 51 includes a base from which a rotatable shaft 52 extends upwardly. In addition, a jar 53 is mounted on the blender base in known fashion over the shaft to receive a supply of water. The jar 53 includes a shelf 54 disposed within and across a lower portion so as to subdivide the jar. The shelf 54 includes an inlet 55 to permit passage of water from the upper portion to the lower portion. In addition, the shelf has an outlet 56 in which a nozzle 57 is secured. In addition, the device 50 includes a filter housing 58 which is sealingly mounted on the nozzle 57. This housing 58 includes a spout 59 at an upper end and is otherwise similar to the filter housings described in U.S. patent application Ser. No. 539,608 filed Jan. 8, 1975, now U.S. Pat. No. 3,950,253. As shown, a seal 60 is provided between the nozzle 57 and the filter housing 58.

In addition, the device 50 includes an impeller 61 within the jar below the shelf 54 which is coupled to the shaft 52 by any suitable coupling means 62 so as to rotate with the shaft 52.

During use, with the blender connected to a suitable power source and activated, and with a supply of water within the jar 53, the impeller 61 forces the water below the shelf 54 upwardly through the outlet 56 and nozzle 57 into the filter housing 58. After being treated within the filter medium within the housing 58, the treated water is dispensed through the spout 59.

It is to be noted that the action of the impeller 61 is sufficient in order to cause a current of water to flow through the nozzle 57 into the filter housing 58 rather than through the inlet 55 of the shelf. To this end the region below shelf 54 must be shaped in a manner, which causes the water to flow preferentially via nozzle 57.

Referring to FIG. 7, the portable water filtration device 61 may also be constructed with a housing 62 which defines a closed reservoir of water, a filter 63 which is connected to the reservoir 62 in any suitable manner, a spout 64 for dispensing of treated water and a vacuum pump 65. The vacuum pump 65 and spout 64 may be connected in parallel to the filter 63 via suitable lines 66, 67. In use, with water in the reservoir, and the vacuum pump 65 activated, a sufficient pressure differential is imposed on the level of water within the reservoir so as to have the air pressure on the reservoir force the water through the filter 63 to the spout 64.

Referring to FIG. 8, the portable water filtration device may also be provided with a suitable sterilizing means for treating the water prior to filtration. As shown, the device 68 includes a housing 69 of open construction which is to receive a reservoir of water 70, a pump 71 which communicates via a suitable inlet 72 with the interior of the housing 69, and a filter 73 similar to that described in FIG. 6 which communicates with the pump via a suitable nozzle and seal similar to that described in FIG. 6. The filter 73 also includes a spout 74 at the upper end in a manner similar to that described in FIG. 6.

In addition, the filtration device includes a sterilizing means in the form of an ultraviolet lamp 75 which is mounted within the housing to project into the reservoir of water 70. As indicated, the lamp 75 is mounted on a shelf 76 of the housing 69 and has a power cable 77 extending out of the housing 69. In order to protect the lamp 75 against the water, a quartz envelope 78 is mounted on the shelf 76 to envelope the lamp 75.

In use, with a supply of water within the housing 69, lamp 75 is activated so as to sterilize the water. Thereafter, the pump 71 is activated via a suitable time delay (not shown) so as to pump the sterilized water through the filter 73 and out the spout 74.

In order to enhance the sterilization of the water, the housing 69 may have a cover (not shown) of a type as illustrated in FIG. 1 with corresponding changes being made in the filter 73 and the spout 74 to accommodate the cover. In addition, other types of germicidal lamps may also be used in place of the ultraviolet light. The construction of the pump 71 and the filter 73 may be similar to that as described in the above-mentioned patent application.

Referring to FIG. 9, the portable water filtration device 80 includes a housing 81 of sealed construction similar to that described in FIG. 1. In addition, a pump 82 is connected to the interior of the reservoir 81 and a filter 83 is connected in communication with the pump 82. Also, a spout 84 is connected to the downstream end of the filter 83 for dispensing treated water. A sterilizing means in the form of a chlorine injection device 85 is mounted in the cover 86 of the housing 81 and is activated either manually or automatically. To this end, the ejection device 85 is constructed so as to inject a predetermined dosage of chlorine into the water contained within the housing 81 upon activation. In use, the dispensing means 85 may be activated prior to activation of the pump 82 via a suitable time delay (not shown) so as to carry out sterilization prior to filtration. In addition, the filter 83 may include a charcoal filtering medium or similar medium fo extracting the chlorine from the water passing to the filter so as to improve the taste and odor of the dispensed water.

Referring to FIG. 10, wherein like reference characters indicate like parts as above, the portable filtration device 87 includes a housing 88 of open construction in which a chlorine column 89 is mounted as a sterilizing means. Alternatively, the housing 88 may be of closed construction.

During use, depending upon the level of water within the housing 87, the chlorine column 89 is constantly in contact with the water so as to carry out a sterilizing treatment. The amount of time that the water remains in contact with the chlorine column 89 may be determined in any suitable fashion. For example, the pump 82 may be timed so as to be activated after the housing 88 has been filled and the water has been allowed to be in contact with the chlorine for a predetermined time. This may be done automatically or manually.

Referring to FIG. 11, the portable filtration device 90 includes a housing 91 of open construction which defines a reservoir chamber. In a similar fashion as above, a pump 92 communicates with the housing via a suitable inlet 93 and a filter 94 communicates with the pump via a suitable outlet 94. As indicated, the filter 94 is located within the housing 91. In addition, a spout 95 is connected to the outlet of the filter 94.

A recirculating means is provided in the device 90 so that at least a part of the flow from the filter 94 can be recirculated to the reservoir chamber. This permits an increased length of treatment of the water. As indicated, the recirculating means includes a valve 96 between the filter 94 and the spout 95 and a second spout 97 which extends from the valve. In operation, the valve 96 functions so as to selectively direct a flow of treated water from the filter to either one of the spouts 95, 97. If directed through the spout 95, the treated water is dispensed. However, if directed to the spout 97, the water is directed back into the reservoir chamber. This water may then be treated by being pumped via the pump 92 into the filter 94.

The valve 96 may be of a type which permits flow through only one of the spouts 95, 97 at a time or which may permit varied amounts of flow through both of the spouts 95, 97.

In the case where the valve permits flow only through the return spout 97 to the reservoir chamber, the valve may be activated for a predetermined length of time so as to permit recirculation of the quantity of water through various multiple cycles. Thereafter, the valve may be deactivated or activated so as to permit dispensing only through the outlet spout 95.

The various filters utilized by the various embodiments may be of any suitable type, for example, as described in the above-mentioned patent application. In addition, the various sterilizing means utilized may be of any suitable type. Also, any suitable sterilizing medium may be incorporated in the filter medium, for example, silver and treated activated charcoal may be utilized within the filter medium. Other sterilizing medium which may also be used include a bromide and a tri-iodide system.

The invention thus provides a portable water filtration device which may be utilized in the home or in environments where small quantities of pure water are required. Further, since the invention allows the use of air pumps or pumps of low horsepower, the overall cost of the device may be minimal.

Still further, the invention provides various water filtration devices which can be easily manipulated and moved from place to place. Thus, the devices may be readily used in the home and stored in out of the way places when not in use. To this end, the various devices may be of particularly compact construction so as to economize on space.

What is claimed is:

1. A portable water filtration device comprising
a housing defining a reservoir chamber for water and having a capacity of one to five quarts;
a cover secured to said housing;
a seal between said cover and said housing;
an inlet in said cover for introduction of water into said chamber;
a cap for selectively sealing said inlet;
a filter threadably secured to said cover and depending into said chamber, said filter including at least one filter medium, and a submicron membrane encasing said filter medium, said membrane being impermeable to the passage of water under normal pressure but which is rendered permeable under pressurized conditions;
a spout extending through said cover into communication with said filter to deliver treated water therefrom; and
an air pump mounted on said cover to pump air into said chamber to force water in said reservoir chamber upwardly through said filter and into said spout for dispensing therefrom.

2. A portable water filtration device as set forth in claim 1 wherein said cap is threadably mounted on said inlet.

3. A portable water filtration device as set forth in claim 1 wherein said filtering medium is of high density.

4. A portable water filtration device as set forth in claim 1 wherein said filter is of cylindrical shape.

* * * * *